July 25, 1950     C. J. ROTHER ET AL     2,516,805

VENTILATING APPARATUS

Filed Nov. 1, 1946

INVENTORS
Carl J. Rother &
BY George W. Larson

ATTORNEY

Patented July 25, 1950

2,516,805

UNITED STATES PATENT OFFICE 2,516,805

VENTILATING APPARATUS

Carl J. Rother and George W. Larson, San Diego, Calif., assignors to Consolidated Vultee Aircraft Corporation, San Diego, Calif., a corporation of Delaware Application November 1, 1946, Serial No. 707,104

4 Claims. (Cl. 98—40)

1

This invention relates to ventilating apparatus and more particularly to controllable ventilator outlets.

An object of the present invention is to provide an improved form of ventilator outlet comprising means for controlling the volume of air flowing therethrough.

Another object resides in the provision of a ventilator outlet of an improved construction wherein the sound produced by airflow through the outlet is minimal.

A further object is the providing of an improved ventilator outlet adapted for use in a vehicle, such as an airplane, which is readily operable by the individual passenger to control the volume of ventilating air flowing through the outlet and the direction of airflow.

A still further object lies in providing an improved ventilator outlet having a simplicity of design, in which the various members effectively cooperate to produce the desired result, and which is economical of construction.

Other objects and features of the present invention will be readily apparent to those skilled in the art from the following specification and appended drawings wherein is illustrated a preferred form of the invention, and in which.

Figure 1:
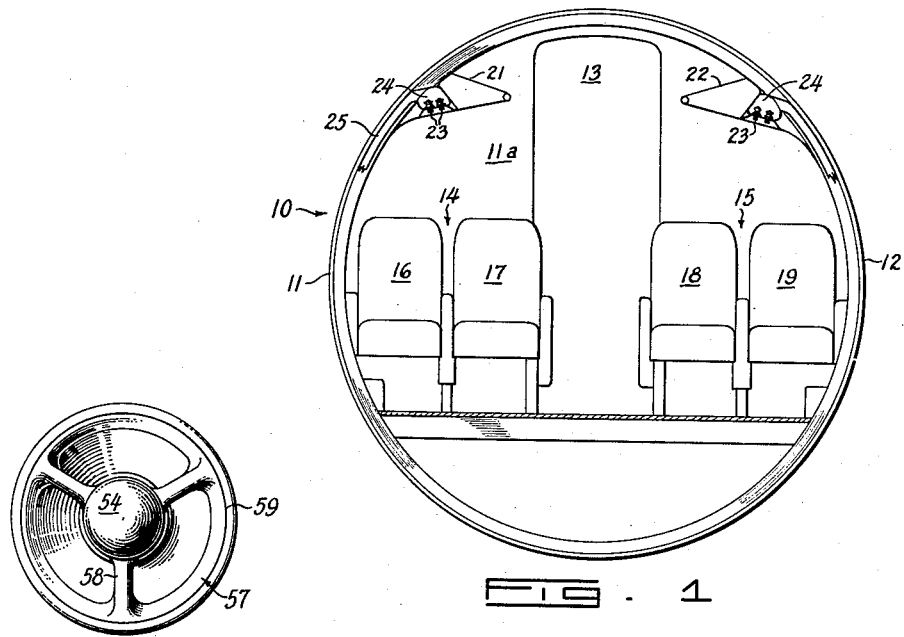
Figure 1 is a diagrammatic transverse section of a passenger cabin of an aircraft employing ventilator outlets embodying the present invention.

The drawings illustrate the use of the present invention in a vehicle which for the sake of illustration is here understood to be an aircraft. Having reference particularly to Figures 1 and 2 there is shown a portion of an aircraft cabin passenger compartment indicated generally by the numeral 10 and shown here as comprising arcuate walls 11 and 12, although the walls may assume other shapes. Forming the rear wall of the cabin compartment 10 is a bulkhead 11a having a centrally located doorway 13 provided therein for ingress to this compartment. Disposed in the passenger compartment 10 are a plurality of seats arranged transversely of the cabin and in double rows 14 and 15, one row 14 consisting of a pair of seats 16 and 17, and the other row 15 comprising the seats 18 and 19, and with the rows being separated by a central aisle which is in line with the doorway 13. Extending over the rows

2 of seats 14 and 15 are shelf-like members 21 and 22 which may serve for stowage of minor baggage.

Located adjacent the points where the shelf-like members 21 and 22 are joined to the arcuate walls 11 and 12 and arranged in pairs are ventilator outlet units 23. The ventilator outlet units 23 are disposed in air receiving positions in longitudinally extending troughs or ventilating passages 24 which run the length of the cabin. Connected to each trough 24 is an air supply duct 25 which leads from the source of ventilating air. The source of ventilating air and the connecting ducts between this source and the air supply ducts 25 are not shown as their particular construction or arrangement is not a part of this invention. The air supply ducts 25 are formed into each of the arcuate walls 11 and 12 and, as shown, are of the same general conformation as the walls.

Figure 3:
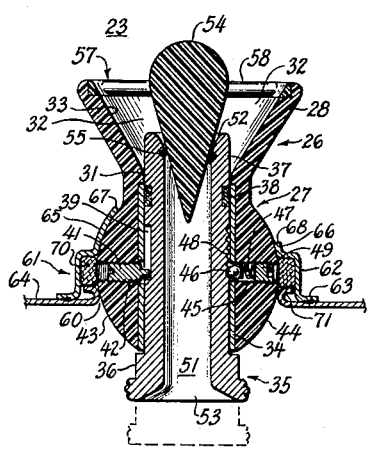
Figure 3 is a vertical sectional view of a ventilator outlet according to the present invention.
Figure 4:
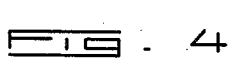
Figure 4 is a top plan view of the ventilator outlet.

A ventilator outlet unit 23, as best illustrated in Figures 3 and 4, comprises a main body portion or housing 26. The housing 26 embodies a substantially spherical or ball portion 27 having integral therewith and extending therefrom a substantially truncated cone shaped or flared portion 28. The housing 26 is formed of a plastic material for ease of construction and lightness of weight, but the particular material of which the housing is made forms no part of the present invention and any suitable material such as aluminum, magnesium, steel or the like, may be utilized. The housing 26 is open from top to bottom, the opening comprising a passage 31 extending through the ball portion 27 and which opens into and communicates with an inlet chamber 32 defined by the diverging inner wall surface 33 of the flared portion 28.

Disposed within the bore 31 and extending substantially the length thereof is a metallic tube or liner member 34 which is held in place as by a press fit or in any other appropriate manner. Mounted for axial movement within bore 31 and fitting within the liner member 34 and adapted to slide thereon is an elongated cylindrical plunger or tubular member 35. The tubular member 35 is provided within an enlarged cylindrical portion 36 at one end which is adapted to be grasped readily to effect rectilinear movement of the tubular member 35 within passage 31 and to swing the housing 26, as will be hereinafter further described, to direct air to a desired position on a passenger seat. In the outer wall surface 37 of plunger 35, and at a point spaced from the upper end thereof, there is formed a peripheral groove, within which groove is fitted a sealing ring 38 to prevent the leakage of air between the plunger or tubular member 35 and the liner member 34.

Substantially midway on the outer wall surface 37 of tubular member 35 there is located a recess 39 into which extends the end of a stop screw 41 after it has passed through an opening in the liner member 34. This screw end is adapted to engage with the vertically spaced upper and lower defining wall surfaces of recess 39 on telescoping movement of the tubular member 35 to thereby limit the amount of inward and outward movement that may be provided the tubular member 35.

The stop screw 41 is disposed for movement within an internally threaded bore 42 which extends through wall 43 of the ball portion 27, the bore 42 being directed at right angles to and opening into the main passage 31 located in ball portion 27. In the opposite wall 44 of ball portion 27 and extending therethrough and also at right angles to and opening into main passage 31 is another bore 45 a portion of which is internally threaded. Bore 45 is in substantial alignment with bore 42. Located within bore 45 is a ball 46 and a spring 47 with one end of spring 47 bearing upon the ball 46. A stud 49 is adapted to thread into the outer end of bore 45 and engage the other end of spring 47 to provide a compressive force upon spring 47 upon movement of the stud 49 inwardly to urge the ball 46 to the opposite end of bore 45 and toward the main passage 31. The amount of spring force acting upon ball 46 can be varied by movement of the stud 49.

Aligned with the inner opening of bore 45 is an opening in liner member 34 through which the ball 46 is adapted to move to contact the outer wall surface 37 of tubular member 35. On the outer wall surface 37 of tubular member 35 in the area adjacent the bore 45 there is provided a vertically spaced series of depressions or recesses 48 into each of which the spring pressed ball 46 is adapted to extend or fit as each depression or notch 48 is aligned with the inner opening of bore 45 on axial movement of tubular member 35 within bore 31 of housing 26. The spring pressed ball 46, therefore, cooperating with the series of depressions 48 on the wall 47 of tubular member 35 effects an indexing means for the tubular member 35 whereby the tubular member 35 is adjustably supported and may be positively located within ball portion 27 in a variety of positions.

The cylindrical plunger or core member 35 has a bore or passage 51 which extends the length thereof and which terminates in an inlet 52 and an outlet 53 both of which are made to flare outwardly. Into the inlet end 52 of passage 51 of the cylinder 35 extends a substantially conical shaped member or needle 54 having the vertex thereof directed in the direction of the length of cylinder 35. In the uppermost position of cylinder 35 the converging walls of cone 54 are engaged by the end of the cylinder 35 to completely close passage 51. Mounted in an annular groove provided near the upper end of passage 51 is a resilient sealing ring 55 which is adapted to fit tightly against the cone 54 when it is in closed position to prevent leakage of air into passage 51. As the cylinder 35 is moved in a direction away from the conical member 54 air can pass therearound and into passage 51. Thus volume control is effected by the push-pull adjustment of plunger 35, for movement of this plunger relative to conical member 54, it is seen, will vary the size of the aperture through which the air enters. The greater the distance the plunger 35 is spaced from the conical member 54 the greater the amount of air that can flow into and through the passage 51. The cylinder or plunger 35 cooperating with the conical member 54 thereby provides an effective control of the amount of air that can pass through bore 51 and into the cabin compartment.

As has been stated the upper end 52 of bore 51 is flared, this effects an annular inlet orifice into which the conical member 54 serving as a directional means efficiently directs air. It has been found that the cone 54, by virtue of its shape and location relative to the passage 51, greatly reduces air turbulence whereby the flow of air directed by it into the passage 51 will be smooth and uniform. Reducing turbulence and effecting a smooth and uniform air flow has the tendency to keep the noise produced by the air stream passing into the bore 51 at a minimum.

It is to be further noted that the conical member 54 disposed in the inlet of bore 51 effects a Venturi passage whereby air passing through the Venturi throat is provided with a greater velocity permitting it to be directed more effectively upon a passenger.

The conical member 54 is supported in proper position relative to cylinder 35 by a ring member 57 which is mounted upon the outer end of the flared portion 28 of housing 26. The ring 57 may be secured in position on housing 26 by any suitable adhesive or in any other well known manner. A plurality of rib members 58 extend inwardly from the rim 59 of the ring 57 and are directed toward the center thereof and there are joined to the conical member 54. The ring 57 together with its ribs 58 and the conical member 54 may be formed integrally and out of a suitable plastic, as has been done here, or the conical member 54 may be formed separately and later joined to the ring 57. The manner of construction is not a part of this invention.

Forming the ribs 58 of plastic provides them with a slight inherent resiliency whereby the conical member 54 may have a slight movement so that it will tend to center itself within passage 51 when cylinder 35 has been forced into engagement with it and this self-centering characteristic will thereby tend to effect a positive seal.

As shown in the drawings, the housing 26 of the ventilator unit 23 extends into and through an annular aperture 60 provided in the floor 64 of the trough 24. To support the housing 26 on the trough 24 there is provided a socket member 61. The socket member 61 comprises an annular ring portion 62 having an outwardly extending peripheral flange 63 which is welded, or otherwise secured, to the floor 64 of the trough 24 to rigidly mount the socket member 61 in position. Extending upwardly from the ring portion 62 and contiguous to ball portion 27 is a generally arcuate wall portion 65, of a conformation similar to that of the ball portion 27 of the housing 26. A second generally arcuate wall portion 66, but of substantially less height than wall portion 65 to which it is connected, is disposed on the opposite side of the ball portion 27 and in engagement therewith. The arcuate wall portions 65 and 66 provide a seat for the ball portion 27 whereby the housing 26 will be mounted for universal movement to provide an effective directional control of the air stream by the passenger.

This support provided by the socket member 61 permits the housing 26 to be pivotally or swingingly moved and to be rotated about its own axis as desired.

The defining upper edge 67 of wall portion 65 and the defining upper edge 68 of wall portion 66 are engageable by the outer surface of housing 26 and serve to limit the amount of pivotal or swinging movement to be had by the housing 26 and thereby define the angle of diffusion of air within the cabin compartment.

A felt seal 70 encircles the ball portion 27 of housing 26 generally at the central portion thereof and also serves to prevent leakage of air about the outer wall of ball portion 27 and into the cabin compartment. The trough 24 is provided with an annular flange 71 about the aperture 60 which cooperates with the ring portion 62 of socket member 61 to mount the felt seal in position.

To operate the ventilator outlet unit 23 a passenger need only grasp the outer end of the plunger 35 and swing the housing 26 in the socket 61 to bring it to a position which will cause the flow of air to be directed upon that portion of his seat desired by him. Pulling the plunger 35 outwardly from its housing 26, as has been explained, will effect a flow of air through the passage 51 thereof. The volume of air flowing therethrough, it is obvious, is controlled by the distance the tubular member 35 is extended out of its housing 26. The indexing means furnished by the spring pressed ball 46 and the recesses 48 permits the positive locating of the tubular member 35 when the passenger has adjusted this member to a position at which the amount of air flowing is desired by the passenger.

Figure 2:
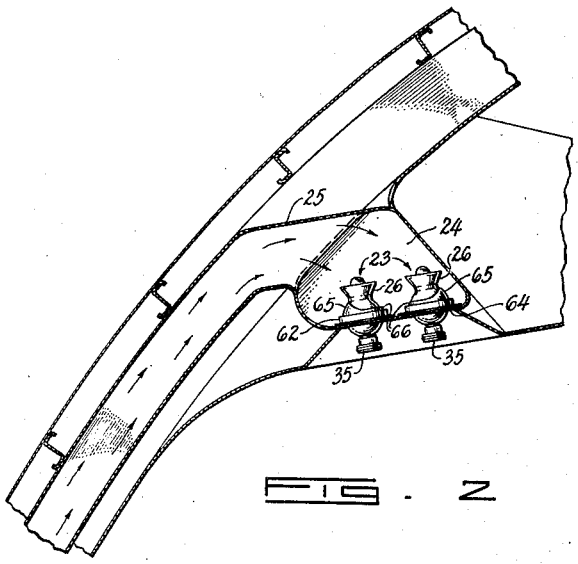
Figure 2 is an enlarged view of a portion of the airplane cabin and showing the ventilator outlets.

One ventilator outlet device 23 is adapted to efficiently service one passenger seat. With the seats in the cabin passenger compartment shown being arranged in pairs there will be a pair of ventilator outlet devices required. As has been stated above the angle of diffusion of air emitting from a ventilator outlet device 23 is determined by the arcuate wall portions 65 and 66 provided by the socket member 61. An angle is chosen which will most efficiently serve a particular passenger seat. Attention is directed to Figure 2 wherein is shown two ventilator outlet units 23. It is noted that the arcuate wall portions 65 and 66 of the respective socket members embodied by this pair of ventilator outlet units 23 are disposed reversed to one another. With this arrangement housing 26 of the inboard unit 23 will swing, from engagement with its arcuate wall portion 65 in a counter-clockwise direction to sweep air over the inboard passenger seat 17, and the housing 26 of the outboard unit 23 will swing in a clockwise direction to direct air over the outboard passenger seat 16. This positioning of outlet units enables each to service primarily its own particular passenger seat with a minimum of interference with the air requirements and desires of the passenger in the adjoining seat.

It has been found that a ventilator outlet device 23 having a converging entrance or inlet 32 to housing 26 as here provided, a conical air directing member 54, and a flared inlet to the passage 51 in the tubular member 35 effects a smooth and uniform flow of air and results in a minimum of noise being produced by the flow of air from the air supply duct 25 through a ventilator outlet unit 23 and into the passenger cabin compartment. It has been found that such noise as may be produced by an open ventilator outlet device 23 is audible, above the airplane noise, only to the person occupying a position directly in the airstream.

Ventilator outlet units in common use have a tendency to produce a great deal of noise in both their open and closed positions. The noise produced when the outlet unit is closed being a high, shrill sound having an annoying quality. The ventilator outlet unit 23 of the present invention has the advantage that it does not produce any such annoying sounds. An outlet unit 23 embodying the construction described hereinbefore is effectively sealed to the passage of leaking air. The conical member 54 and its tubular member 35 cooperate efficiently to effect a positive closure of main passage 51 and there is no inadvertent passing of ventilating air. By preventing air leakage the outlet unit 23 prevents the production of undesirable sounds when the unit is in closed position.

Another feature of the present invention lies in the fact that the stewardess or attendant can determine which of the various ventilator outlet units in the cabin have been left open by a passenger when the airplane has discharged its passengers for only those units are open which have the plunger or tubular element 35 thereof in extended position. There is no necessity for her to examine and handle each individual unit to determine if it is open, as is required by outlets now in use; in the present instance, by a glance, she determines which of the outlets in a cabin are open and pushes those particular plungers that are extended into their respective housings and prepares that ventilator outlet unit for use by the next occupant of the seat.

While certain preferred embodiments of the invention have been specifically disclosed, it is understood that the invention is not limited thereto as many variations will be readily apparent to those skilled in the art and the invention is to be given its broadest possible interpretation within the terms of the following claims.

We claim:

1. A ventilating outlet device comprising a housing having a bore extending therethrough for the passage of air, a regulating means carried by said housing for controlling the volume of air passing through said housing, said regulating means comprising a tubular member having inlet and outlet openings, indexing means mounting said tubular member for adjustable movement in the bore of said housing, a generally conical shaped air directing member, mounting means carried by said housing above the inlet opening of the tubular member comprising flexible rib members supported at one of their ends by the housing and extending inwardly to connect at their opposite ends with the generally conical shaped member, adjustably support said generally conical shaped member with the vertex thereof pointing inwardly into the housing bore and adapted to project through the inlet opening of said tubular member, said tubular member having a portion thereof disposed exteriorly of said housing by means of which it may be moved inwardly and outwardly of said housing to enable the interiorly located portion of said tubular member to encompass varying portions of said generally conical shaped member along the length thereof to vary the size of said tubular member inlet opening, and to move the opposite end of said tubular member into and out of engagement with the lateral surfaces of said generally conical shaped member to close and open said tubular member inlet opening.

2. A ventilating outlet device comprising a housing having a bore extending therethrough for the passage of air, a regulating means carried by said housing for controlling the volume of air passing through said housing, said regulating means comprising a tubular member having inlet and outlet openings, said tubular member having an annular groove provided in its interior wall surface adjacent the tubular member's upper end, a resilient sealing ring disposed in said annular groove, means mounting said tubular member for slidable movement in the bore of said housing, a generally conical shaped air directing member, mounting means carried by said housing above the inlet opening of the tubular member having flexible rib portions which adjustably support said generally conical shaped member with the vertex thereof pointing inwardly into the housing bore and adapted to project through the inlet opening of said tubular member, said tubular member having a portion thereof disposed exteriorly of said housing by means of which it may be moved inwardly and outwardly of said housing to enable the interiorly located portion of said tubular member to encompass varying portions of said generally conical shaped member along the length thereof to vary the size of said tubular member inlet opening, and to move the sealing ring carried at the interior end of said tubular member into and out of sealing engagement with the lateral surfaces of said generally conical shaped member to close and open said tubular member inlet opening.

3. A ventilating outlet device for a vehicle comprising a housing having a bore extending therethrough for the passage of air, said housing embodying a substantially spherical portion, means for pivotally supporting said housing in said vehicle, said supporting means comprising a socket element within which said substantially spherical portion of said housing is adapted to seat, said socket element embodying a pair of oppositely disposed arcuate wall portions of different heights disposed in contiguous and embracing relation to said substantially spherical portion of said housing and which wall portions of different heights are engageable at an edge of each to determine the extent of pivotal movement of said housing, an air regulating means carried by said housing for controlling the volume of air passing through said housing, said air regulating means comprising a tubular member having inlet and outlet openings, means mounting said tubular member for slidable movement in the bore of said housing, a generally conical shaped air directing member, mounting means carried by said housing above the inlet opening of the tubular member for supporting said generally conical shaped member with the vertex thereof pointing inwardly into the housing bore and adapted to project through the inlet opening of said tubular member, said tubular member having a portion thereof disposed exteriorly of said housing whereby said housing may be pivotally moved upon its support and by means of which the tubular member may be moved inwardly and outwardly of said housing to enable the interiorly located portion of said tubular member to encompass varying portions of said generally conical shaped member along the length thereof to vary the size of said tubular member inlet opening, and to move the opposite end of said tubular member into and out of engagement with the lateral surfaces of said generally conical shaped member to close and open said tubular member inlet opening.

4. A ventilating outlet device for a vehicle comprising a housing embodying a substantially spherical portion, and an integral flared portion formed by diverging wall surfaces extending from said generally spherical portion, said generally spherical portion having a bore therethrough in communicating relation with a chamber defined by said diverging wall surfaces whereby air may be passed through said housing, means for pivotally supporting said housing in said vehicle, said supporting means comprising a socket member embodying a pair of oppositely located generally arcuate wall portions which are disposed in contiguous and embracing relation to said substantially spherical portion of said housing to provide a seat therefor, said pair of oppositely located generally arcuate wall portions being of different heights and having defining edges engageable by said housing to serve as stops to determine the extent of pivotal movement of said housing, an air regulating means carried by said housing for controlling the volume of air passing through said housing, said air regulating means comprising a movable tubular member having inlet and outlet openings, indexing means adjustably mounting said tubular member in the bore of said housing, said tubular member having an annular groove provided in its interior wall surface adjacent its upper end, a resilient sealing ring disposed in said annular groove, a generally conical shaped air directing member, mounting means carried by said diverging wall surfaces of said housing having flexible rib portions which adjustably support said generally conical shaped member with the vertex thereof pointed inwardly and toward said tubular member, and adapted to project through the inlet opening of said tubular member, said tubular member having a portion thereof disposed exteriorly of said housing whereby the tubular member may be moved inwardly and outwardly of said housing to a variety of positions relative to said generally conical shaped member to vary the size of said tubular member inlet opening, and to carry said resilient sealing ring into and out of engagement with the lateral surfaces of said generally conical shaped member to close and open said inlet opening of said tubular member, said exteriorly disposed portion of said tubular member providing a means for pivotally moving said housing upon its support.

CARL J. ROTHER.
GEORGE W. LARSON.

REFERENCES CITED

The following references are of record in the file of this patent:

UNITED STATES PATENTS

| Number | Name | Date |
|---|---|---|
| 1,569,667 | Neilson | Jan. 12, 1926 |
| 1,921,457 | Dickinson | Aug. 8, 1933 |
| 2,189,502 | Johnston | Feb. 6, 1940 |
| 2,372,830 | Honerkamp et al. | Apr. 3, 1945 |

FOREIGN PATENTS

| Number | Country | Date |
|---|---|---|
| 16,654 | Great Britain | 1909 |
| 351,050 | Great Britain | June 22, 1931 |
| 360,727 | Great Britain | Nov. 12, 1931 |
| 501,926 | Great Britain | Mar. 8, 1939 |
| 520,452 | Great Britain | Apr. 24, 1940 |
| 571,761 | Great Britain | Sept. 7, 1945 |
| 662,360 | Germany | July 11, 1938 |